United States Patent [19]

Jones

[11] 4,079,664
[45] Mar. 21, 1978

[54] COLLAPSIBLE CONTAINER FORMING MACHINE

[75] Inventor: Milton E. Jones, Cincinnati, Ohio

[73] Assignee: Victor Metal Products Corporation, Cincinnati, Ohio

[21] Appl. No.: 676,745

[22] Filed: Apr. 14, 1976

[51] Int. Cl.² .................................... B31B 15/60
[52] U.S. Cl. .................................. 93/36.8; 93/82; 93/77 R; 93/DIG. 1
[58] Field of Search .............. 93/36.8, 82, 20, 77 R, 93/DIG. 1; 156/69, 446

[56] References Cited

U.S. PATENT DOCUMENTS

| | | | |
|---|---|---|---|
| 2,411,244 | 11/1946 | Bogoslowsky | 93/36.8 |
| 3,376,181 | 4/1968 | Larson et al. | 93/82 X |
| 3,399,427 | 9/1968 | Harp, Jr. | 93/77 R |
| 3,546,835 | 12/1970 | Mobley | 93/82 X |
| 3,777,632 | 12/1973 | Pepmeier | 93/82 X |
| 3,778,321 | 12/1973 | Abbott | 93/36.8 X |
| 3,823,850 | 7/1974 | Holoubek et al. | 93/36.8 X |
| 3,896,710 | 7/1975 | Holoubek et al. | 93/36.8 |
| 3,910,171 | 10/1975 | Reinhardt et al. | 93/82 |

FOREIGN PATENT DOCUMENTS 759,852  6/1940  Germany ........................ 93/36.8

Primary Examiner—Roy Lake
Assistant Examiner—Paul A. Bell
Attorney, Agent, or Firm—Albert F. Kronman

[57] ABSTRACT

A thin flat strip of laminated material is directed through a die which forms it into a tubular member. The longitudinal margins of the tubular member are overlapped and sealed together. Thereafter, the tube is severed from the strip and fed on to a spindle extending outwardly from the face of a rotatable plate. The plate is then rotated through a series of stations in which the outer end of the tube is precisely formed with a series of equally spaced flutes, the flutes are twisted to produce a neck and shoulder configuration, an outsert having the shape of the neck and shoulder of a collapsible container is slipped upon the twisted portion of the tube and sealed thereto and a closure cap is threaded upon the outsert neck. The completed container is then unloaded from the spindle.

6 Claims, 19 Drawing Figures

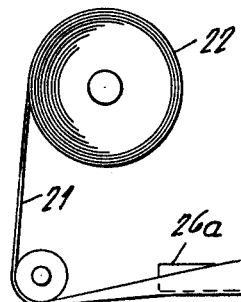
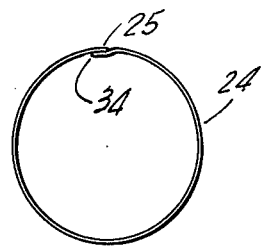
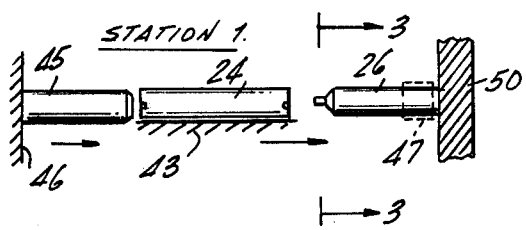
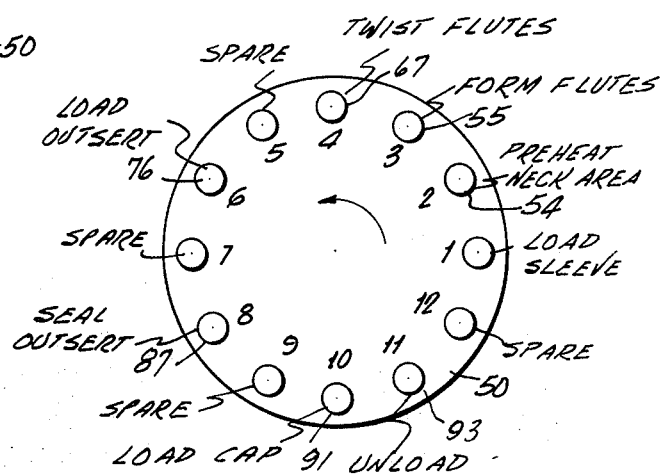
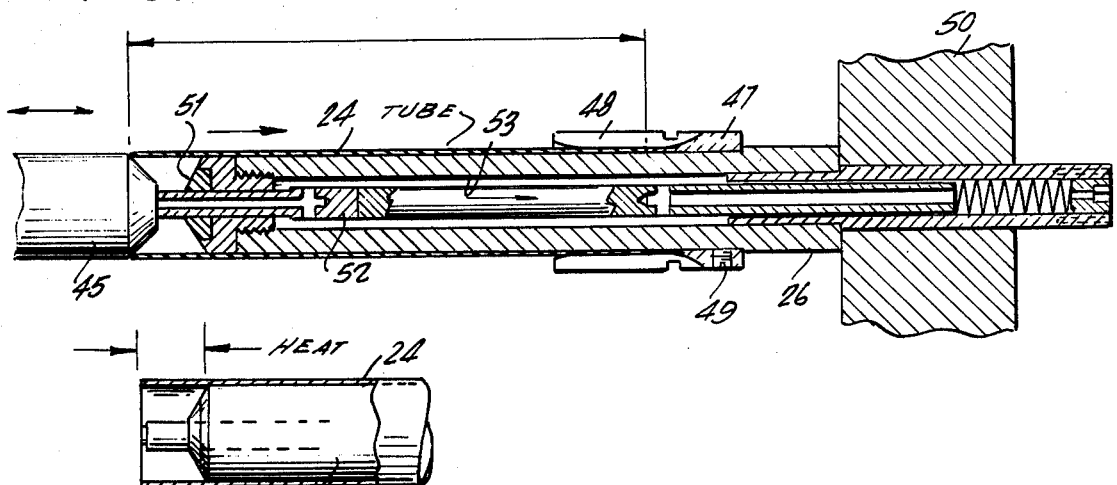

COLLAPSIBLE CONTAINER FORMING MACHINE

BACKGROUND OF THE DISCLOSURE

The present invention constitutes an improvement over the apparatus described and shown in U.S. Pat. No. 3,778,321 issued Dec. 11, 1973 to Joseph L. Abbott. While this patent taught the manufacture of a collapsible container from a thin flat sheet of material such as a lamination of metal and plastic it was not capable of achieving the production speeds necessary to make it competitive with other known collapsible container manufacturing apparatus.

Accordingly, it is an object of the present invention to provide a machine for forming a collapsible container from a strip of material at a higher production rate than prior art devices.

Another object of the present invention is to improve the speed of manufacture and fluid tight integrity of the container body.

A further object of the present invention is to more positively control the formation of the neck and shoulder portion of the container and thereby increase the productivity of the machine.

A feature of the present invention is its in-line tubular body forming and sealing mechanism.

Another feature of the present invention in its preheating station where the end of the tubular body is softened prior to further forming.

A further feature of the present invention is its positive yet rapid fluting of the end of the tubular body to assure uniformity of production.

Still another feature of the present invention is its rapid outsert loading mechanism.

SUMMARY OF THE INVENTION

An elongated thin flat strip of material such as a lamination of metal and plastic, with or without decorative layers on one side thereof is fed from a supply roll through a plow die. The plow die forms the flat strip into a tubular configuration with its elongated margins overlapped. The overlapped margins are sealed to form a fluid tight body member for the container. The body member is then slipped upon one of several spindles supported upon a rotatable plate. The spindles are beveled at their outer or free ends and formed with a short cylindrical portion of reduced diameter corresponding to the neck portion of the container to be formed. The free end of the cylindrical body portion is then received upon a series of longitudinally disposed spaced radial fins about which the overlying portion of the tubular body is formed into equally spaced flutes by a complimentary series of spaced fingers. Thereafter, the flutes are twisted upon the spindle to form a neck and shoulder portion upon the end of the tubular body. An outsert having an externally threaded spout and an internal shape corresponding to the neck and shoulder of the formed tubular body is slipped over the free end of the body and secured thereto. A cap or closure is threaded upon the spout and the finished container unloaded from its spindle.

DESCRIPTION OF THE DRAWINGS

In the accompanying drawings forming part hereof, identical parts have been given the same reference numerals, in which drawings;

FIG. 1A is a somewhat diagrammatic view, in side elevation, of the tubular body forming portion of the present invention.

FIG. 1B is a cross sectional view, on an enlarged scale of the tubular body produced by the apparatus of FIG. 1A.

FIG. 2 is a view in side elevation of the tubular body loading station of the present invention.

FIG. 3 is a view of the tube advancing rotatable plate, taken on line 3—3 in FIG. 2.

FIG. 4 is a view on an enlarged scale partially cut away, of the tubular body loading mechanism.

FIG. 5 is a fragmentary view of the preheating station of the present invention.

GENERAL DESCRIPTION

Figure 1:
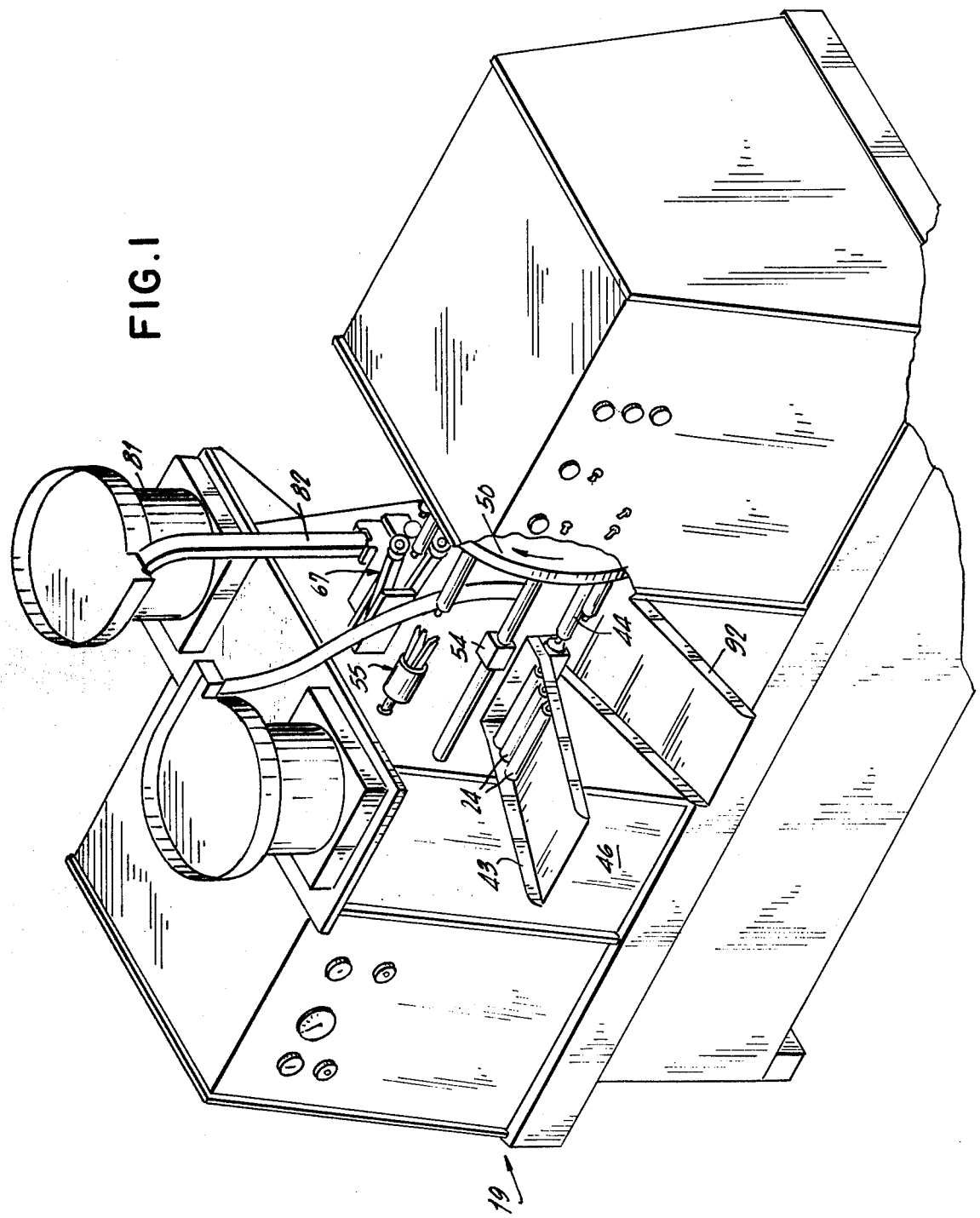
FIG. 1 is a somewhat isometric view of a container forming machine according to the present invention, with the tubular body forming portion omitted for the sake of clarity.

Referring to the drawings and particularly to FIG. 1, there is shown a complete embodiment of the present invention 19 with the tubular body forming mechanism 20 omitted for the sake of clarity. The tubular body forming and advancing mechanism 20 of the present invention is shown in FIG. 1A in which a strip of material 21 is fed from a roll 22 into a plow die 23. The strip of material may consist of a soft metal such as aluminum, zinc, or lead sheet having plastic coatings on one or both of its major surfaces. In addition, certain indicia and decoration may be applied to that surface of the material which is to form the exterior of the container.

The plow die 23 changes the flat strip 21 into a tubular member 24 with its margins overlapped as shown at 25 in FIG. 1B. A guide mandrel 26 which extends through the body forming mechanism serves to guide and supports the strip of material 21.

As the strip of material leaves the plow die 23 it enters a margin sealing station 27. The guide mandrel 26a is cut away at this location to receive a Teflon belt 28 carried upon spaced pulleys 29 freely journaled in the guide mandrel 26 upon shafts 30. The belt 28 is disposed so that it provides a moving support for the tubular body portion beneath the overlapped margins. In addition, the belt 28 cooperates with a complimentary belt 31 carried in a heat sealing head 32 directly above the belt 28. The second belt 31 is also preferably made of Teflon or coated with Teflon or a material having similar properties.

The heat sealing head 32 is mounted for reciprocal motion as indicated by the arrows 33 in FIG. 1A whereby the second belt 31 can be brought against the overlap 25 of the margins 34 to press them firmly together between the belts 28, 31. Pressures of the order of 150 pounds have been found suitable for the purposes of the present invention using laminates of metal with plastic exterior layers. It will be understood that the belts 28, 31 permit the stopping of the tubular body 24 while the pressure is being applied. As soon as the margins 34 are firmly pressed together, heat is applied to them by means of induction heating coils 35 within the heat sealing head 32. Electrical potential is applied to the coils 35 by means of terminals 36 connected to a suitable source (now shown). When the margins 34 have become fused together into a fluid tight seam, the heat sealing head 32 is raised from the tubular body which is then advanced by rollers 37 into a cut off station 38.

The tubular body forming material 21 is provided with suitable indicia as indicated at 39, at fixed intervals along its length. The spaced indicia are such that they will cause a photoelectric cell 40, disposed above the line of travel of the tubular material 24, to sense their presence and energize a cut off blade 41 to sever the elongated tubular material into tubular bodies of desired length. The cut off blade 41 may be actuated by a solenoid, hydraulicly or in any other suitable manner and is timed to operate during the heat sealing cycle of subsequent portions of the tubular material. The cut off blade 41 operates in conjunction with the guide mandrel 26 and a tube guide bushing 42. The electrical or hydraulic means for operating the heat sealing head and blade together with their switching circuits and or valves are well-known in the material handling art, form no part of the present invention, and need not be further described herein.

Referring to FIG. 1 it will be seen that the severed lengths of tubular material, which will become the container bodies 24 are caught by a chute 43 and directed at an angle into the loading station 44 of the dispensing end forming portion of the machine.

The loading station 44 for the tubular bodies 24 is shown in detail in FIGS. 2 and 4 and in its relationship to the other operating stations in FIG. 3. In FIG. 2 the tubular body 24 is shown on the chute 43 in axial alignment with a plunger 45 driven by a pneumatic cylinder (not shown) carried within the machine housing 46. The plunger urges the tubular body 24 laterally out of the chute 43 and on to one of the 12 mandrels 26 carried by a rotatable plate 50. The mandrel 26 has an outside diameter of a size which will permit the tubular body 24 to slide freely thereon but which will support the said body internally.

The mandrel 26 is somewhat longer than the tubular body 24 and provided with a collet 47 to grasp the end of the tubular body 24 as it is slipped upon the mandrel. The collet 47 is formed with six longitudinally extending resilient fingers 48 which hold the tubular body upon the mandrel. Adjustability for different length tubes is provided on the collet by a set screw 49. The end of the mandrel 26 not secured to the plate 50 is beveled as indicated at 51 to conform to the shoulder configuration of the finished container. An elongated cylindrical spring loaded plunger 52 is axially carried within a bore 53 in the mandrel 26. The plunger 52 extends outwardly of the end of the mandrel a short distance for a hereinafter more fully described purpose. An unsupported portion of the tubular body 24 extends beyond the free end of the mandrel.

With the tubular body 24 loaded upon the mandrel 26, the plate 50 is rotated to advance the said tubular body into the next or pre-heating station indicated at 54 in FIGS. 1 and 3. At this station air warmed by electrical heating elements (not shown) is directed over the free end of the tubular body 24. Where a plastic laminate is used for the tubular body a temperature of the order of 400° F for a period of ¾ to 1 second has been found suitable to soften the plastic of the laminate. This step facilitates the fluting operation.

Figure 6:
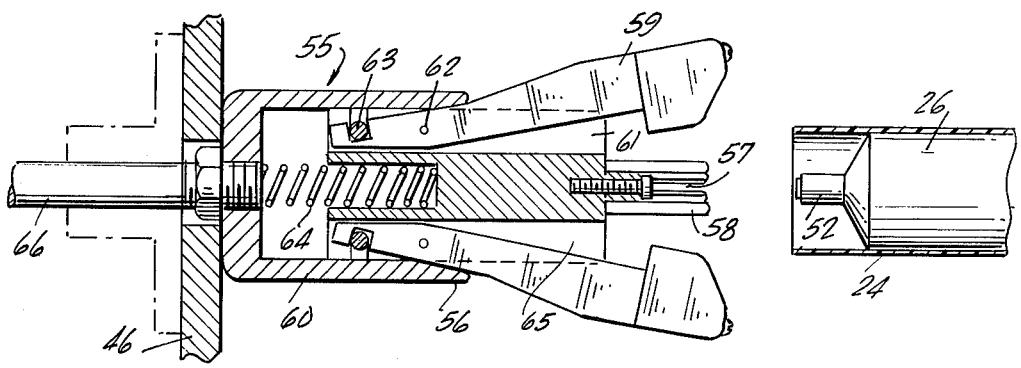
FIG. 6 is a view in longitudinal cross section to an enlarged scale, showing the first step in the tube fluting operation.
Figure 7:
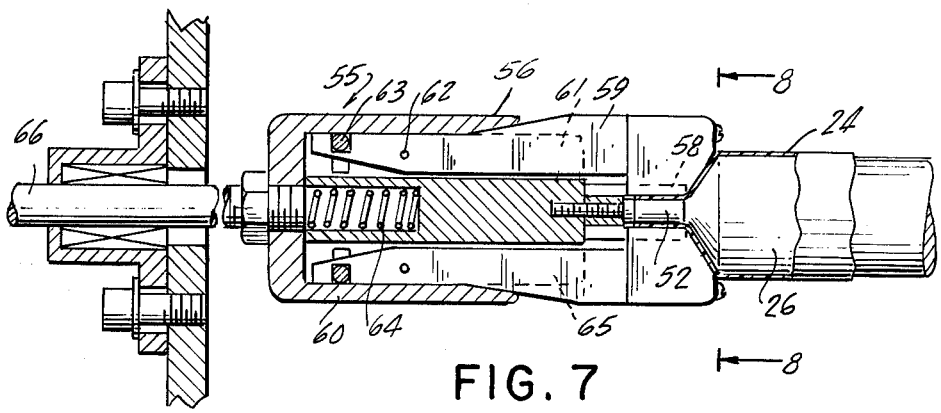
FIG. 7 is a view similar to FIG. 6 showing the completion of the fluting step.
Figure 8:
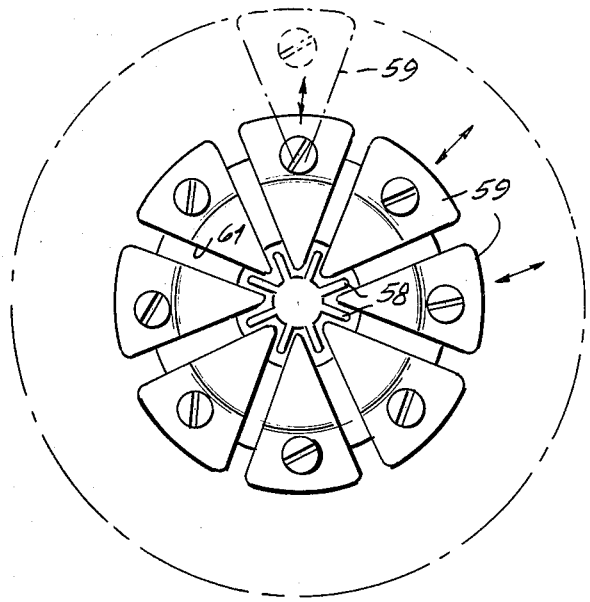
FIG. 8 is an end view taken on line 8—8 in FIG. 7 looking in the direction of the arrows.

The tubular body with its heated end portion is next rotated to the flute forming station 55 best shown in FIGS. 6-8. A flute forming assembly 56 which extends outwardly of the housing 46 is extended in the direction of the tubular body 24. The assembly 56 is provided with an axial bore 57 to receive the end of the plunger 52. The heated end of the tubular body 24 is then disposed between a series of spaced radial fins 58 (best shown in FIG. 8) and a series of radially disposed spaced fingers 59. The fins 58 and fingers 59 are complimentary so that as the flute forming assembly 56 continues to move in the direction of the tubular body the fingers 59 are swung into the spaces between the fins 58 thereby fluting the heated portion of the tubular body 24 in the manner shown in FIGS. 9 and 10. The precise and rapid fluting of this portion of the tubular body 24 is essential to the successful high speed operation of the container forming machine since even slight variations in the uniformity of the flutes will result in manufacturing failures.

As shown in FIGS. 6 and 7, the swinging motion of the fingers is produced by the longitudinal movement of a cup shaped member 60 which rides over a slotted support 65 for the fingers 59 and fins 58. The fingers 59 are pivotally secured within the slots 61 by pins 62 and held normally open by a garter spring 63. A coil spring 64 held at each end between the cup shaped member 60 and the slotted support 65 serves to keep the fingers apart until the drive rod 66 compresses the coil spring. The open end of the cup shaped number 60 thereupon bears against the outer surfaces of the fingers 59, causing them to swing inwardly to form the flutes 94 in the tubular body.

Figure 9:
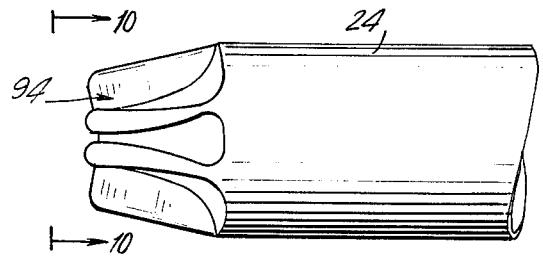
FIG. 9 is an elevational view of the end of the tubular body after fluting.
Figure 10:
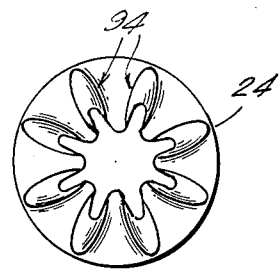
FIG. 10 is an end of the tubular body shown in FIG. 9 taken on line 10—10.

Following the flute forming operation, the drive rod 66 is retracted into the housing 46 returning the flute forming assembly to the condition shown in FIG. 6. The end of the tubular member is then fluted as shown in FIGS. 9 and 10, the flutes 94 being evenly and radially spaced from one another.

Figure 11:
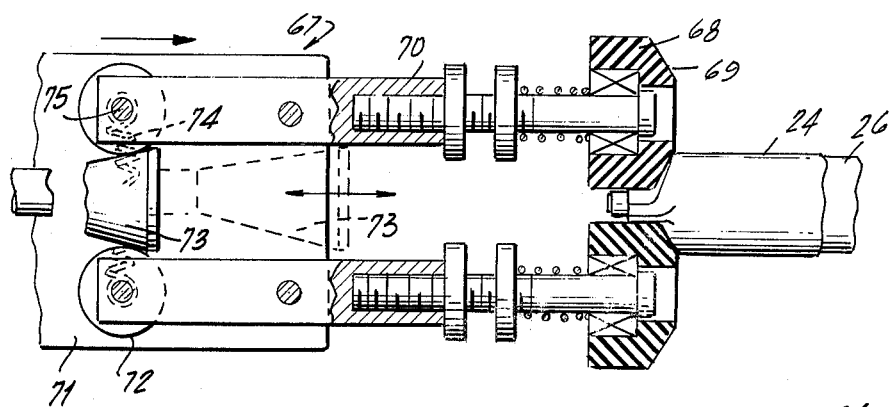
FIG. 11 is an elevational view partly in section of the flute twisting mechanism of the present invention.
Figure 12:
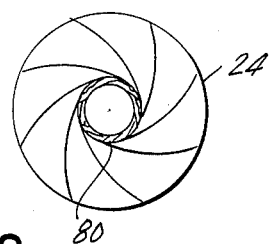
FIGS. 12 and 13 are end and elevation views respectively of the end of the tubular body after the twisting operation.
Figure 13:
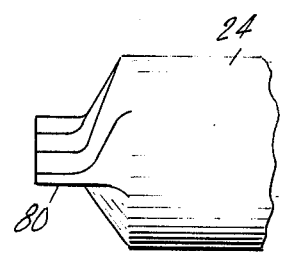

The plate 50 is next rotated to the flute twisting station 67 indicated by the numeral 4 in FIG. 3 and best shown in FIG. 11. At this station the fluted tubular body 24 is brought into axial alignment with a pair of spaced rollers 68 made of some suitable resilient material such as rubber, Neoprene (synthetic rubber), nylon, or the like. The rollers 68 are beveled as indicated at 69 to conform to the angular disposition of the shoulder of the container body. Pivotally mounted arms 70 carried by a support block 71 support the rollers 68 at the outer end thereof. The inner ends of the arms 70 are each provided with a roller 72, which actually are cam followers, for a conical cam shaped member 73. The conical cam 73 is retracted from the tubular body 24 by means of a rod (not shown) which extends into the housing 46 and which is responsive to a hydraulic motor or some other linear motion imparting mechanism (not shown). As the conical cam 73 is retracted the cam followers 72 ride upon the conical cam surface causing the arms 70 to swing inwardly on the fluted end of the tubular body 24. The flutes are rolled between the rollers 68 which cause the flutes to become twisted and to assume the configuration shown in FIGS. 12 and 13. The twisting action imparts the desired neck and shoulder shape to the end of the tubular body 24 and also adds rigidity to the structure.

Following the twisting operation the conical cam 73 is extended whereupon the conical cam 73 assumes the position indicated by the dash lines in FIG. 11. The arms 70 are urged apart by the coil spring 74 which is coupled between the cam following shafts 75.

Figure 16A:
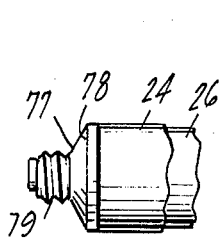
FIGS. 16 and 16A are fragmentary views in longitudinal section and side elevation respectively of the tubular body and outsert following sealing.
Figure 14:
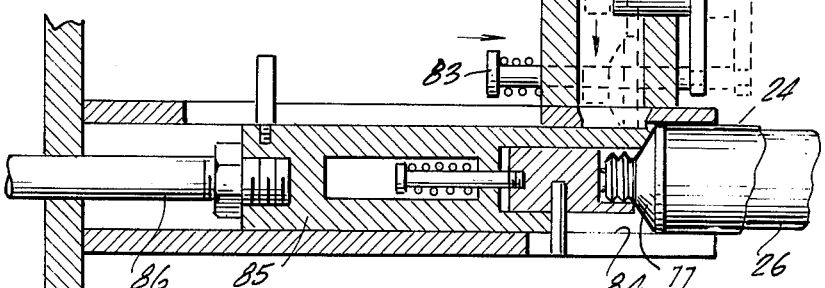
FIG. 14 is an elevational view, partly in section of the outsert loading mechanism of the present invention.
Figure 16:
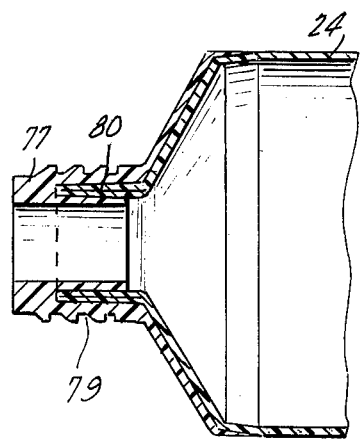

With the end of the tubular body 24 twisted into the form herein above described the plate 50 is again rotated to bring the end of the container into the outsert loading station 76 indicated at 6 in FIG. 3 and best shown in FIG. 14. At this station, an outsert 77 preferably made of plastic material and best shown in FIGS. 16 and 16A is applied to the end of the tubular body. The outsert consists of a shoulder and breast portion 78 and a threaded dispensing neck 79. The internal dimensions of the outsert 77 are such that it will slip over the fluted portion of the tubular body 24.

The nozzle 80 formed at the end of the fluted portion will be received within the dispensing neck 79 in the manner shown in FIG. 16. The outserts 77 are fed into the loading station as shown in FIG. 14. Timing means such as the spring loaded plunger 83 is provided at the bottom of the chute 82 to release one outsert in the timed sequence so that the outsert drops into a chamber 84 within the outsert loading station 76 as the tubular body 24 is brought into axial alignment with the end of the chamber. A small piston 85 slideably carried within the chamber 84 and axially driven by a rod 86 operates to force the outsert 77 upon the fluted end of the tubular body. At this juncture, the end of the container has the appearance shown in FIG. 16A and the piston 85 is retracted so that the plate 50 may be rotated to the next or outsert sealing station 87, indicated by numeral 8 in FIG. 3.

Figure 15:
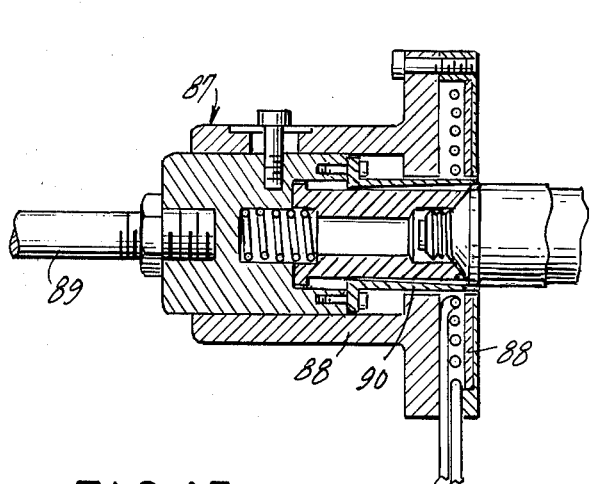
FIG. 15 is an elevational view partly in section of the outsert sealing structure.

The outsert sealing station 87 is best shown in FIG. 15. At this station, the tubular body 24 with the outsert 77 thereon, is brought into register with a heat applying unit shown as an induction heater 88 in FIG. 15. The induction heater 88 is advanced by means of a rod 89 actuated by a suitable mechanism such as a hydraulic motor (not shown) carried within the housing 46. The rod 89 advances the heater 88 until the end of the tube covered by the outsert 77 is received within a tapered sleeve 90 in the heater 88. This tapered sleeve 90 applies radial pressure to the skirt portion of outsert 77. The amount of heat applied at this juncture depends upon the nature of the laminate comprising the tubular body 24 and the amount of material in the outsert 77. It has been found that with laminates well-known in the container manufacturing art and outserts commonly used for this purpose, the induction coil will bond the outsert to the end of the tubular body in between 0.3 to 0.6 seconds. At the end of the sealing operation, the induction heater 88 is withdrawn by means of the rod 89 and the plate 50 again rotated to bring it into place for loading a cap or closure on to the threaded neck of the outsert 77. The cap loading station 91 is indicated by the numeral 10 in FIG. 3. Since the loading and application of caps upon the end of a threaded container is well-known and forms no part of the present invention, it is unnecessary to further illustrate or discuss it in the present application.

The completed container is next rotated by the plate 50 to the unloading station indicated by numeral 11 in FIG. 3 at which juncture, it is slipped off the mandrel 26 and directed by means of the inclined chute 92 into a suitable receptacle.

It will be understood that during the operation of the machine, each of the mandrels shown in the drawings will be supplied with a tubular body 24 and will sequentially undergo the various operations described above in connection with a single container. The specific switching means, sequencing apparatus, timing devices, and motors used in conjunction with the present invention are well-known in the container forming art and have, therefore, not been described in detail in the present application.

Having thus fully described the invention, what is claimed and desired to be secured by United States Letters Patent is:

1. A collapsible container forming machine comprising a source of elongated strip material, die means to longitudinally bend the strip material into an elongated hollow configuration having overlapping longitudinal margins, sealing means to secure the said margins in overlapping, fluid tight relationship, comprising an elongated guide mandrel to internally support the strip material, a discharge end on said mandrel, an elongated cut away portion in the guide mandrel underlying the overlapped margins, a first continuous belt rotatably supported within the cut away portion beneath the overlapped margins, a heat sealing head overlying the said margins, a source of heat in said heat sealing head, a second continuous rotatable belt in the heat sealing head, pressure means to move the second belt into contact with the said margins and against the first belt, a source of heat in the heat sealing head and means to energize the heat source while the said margins are pressed together between the first and second belts; means to sever body members of predetermined lengths from the sealed strip, a rotatable plate-like member, a plurality of elongated mandrels secured at one end to one major surface of said plate-like member and extending outwardly therefrom, a housing on the container forming machine spaced from the free ends of said mandrels, means to successively urge the body members upon the elongated mandrels, means to successively rotate the plate-like member and the mandrels through a series of stations, a pre-heating station for said body members including a source of heated air and means to direct the said air at the end of one of the body members, a flute forming station for the heated end of the body member comprising a flute forming assembly carried within the housing and extending outwardly therefrom in the direction of the mandrel, a series of equally spaced radial fins carried by the flute forming assembly, a complimentary series of radially disposed spaced fingers swingably carried by the flute forming assembly, means within the housing to advance the flute forming assembly to receive the heated end of the body member between the said fins and fingers, means to swing the said fingers to evenly press the heated end of the said body member against the said fins to form evenly spaced flutes in said body member, means to retract the flute forming assembly from the fluted end of the body member, a flute twisting station to receive the fluted end of the body member, at least one roller on the flute twisting station, means to rotate the fluted body member with respect to the said roller, means carried within the housing to advance the roller in the direction of the fluted end of the body member to impart a twisting action to the said flutes until a neck and shoulder are formed thereon, means to retract the said roller upon the completion of the twisting action, an outsert having a neck and threaded nozzle thereon and receivable upon the twisted flutes, an outsert loading station, means to position an outsert upon the fluted end of the body member, an outsert sealing station, a heat applying unit carried by the housing at the outsert sealing station and means to advance the heat applying unit so as to overlie the outsert on the body member to fuse the said outsert to the said body member.

2. A machine according to claim 1 in which the body severing means comprises a reciprocable knife carried at the discharge end of the guide mandrel and sensing means responsive to the position of the strip material to actuate the said knife.

3. A machine according to claim 1 in which each of the mandrels on the plate is provided with a bevel on the outwardly extended end thereof, a longitudinal axial bore in said mandrel and a spring loaded plunger carried in said bore and extending outwardly in said bevel.

4. A machine according to claim 1 in which the body members are heated to 400° F for from 0.75 to 1 second.

5. A machine according to claim 3 in which the flute twisting station comprises at least two spaced resilient rollers, spaced arms, spaced from but parallel to the longitudinal axis of the mandrels to freely support the said rollers, said rollers having beveled surfaces thereon corresponding to the bevel of the mandrel and overlying the fluted position of the tubular member.

6. A machine according to claim 5 in which the resilient rollers are swingably and freely journaled upon the ends of pivotally mounted arms, a cam follower carried on each of said arms at the end opposite the said rollers, and a cam longitudinally movable with respect to the cam followers to swing the said arms about their pivots into and out of contact with the fluted end of the body member.

* * * * *